Figure 1:
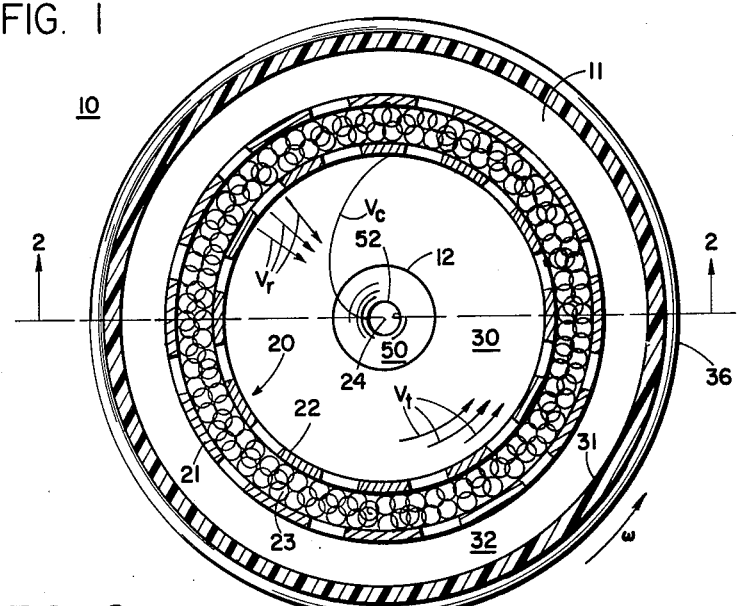

Jan. 25, 1966  P. D. SENSTAD  3,230,765
MAGNETICALLY AND ELECTRICALLY REBALANCED VORTEX RATE SENSOR
Filed March 14, 1962

INVENTOR.
PAUL D. SENSTAD
BY Roger W. Jensen
ATTORNEY.

United States Patent Office 3,230,765
Patented Jan. 25, 1966

3,230,765
MAGNETICALLY AND ELECTRICALLY
REBALANCED VORTEX RATE SENSOR
Paul D. Senstad, Golden Valley, Minn., assignor to
Honeywell Inc., a corporation of Delaware
Filed Mar. 14, 1962, Ser. No. 179,717
7 Claims. (Cl. 73—194)

This invention relates to fluid amplifiers and more particularly to vortex fluid amplifiers.

This invention has special application to angular velocity or rate sensing instruments commonly referred to by those skilled in the art as fluid vortex rate sensors, although the invention is by no means limited to such application. The applicant's invention will be described with reference to a specific embodiment of a fluid vortex amplifier referred to as a vortex rate sensor. A vortex rate sensor is an apparatus which is capable of sensing the angular velocity (rate) about an axis of a body upon which the vortex rate sensor is applied. The measurement of angular velocity (rate) is, as is well understood, useful and/or necessary in many control systems. For example, an angular velocity signal is very useful for control purposes in automatic flight and attitude control systems of aircraft and spacecraft. The vortex rate sensor generally comprises a device which provides a fluid flow field which in the absence of an input rate closely approximates the classical two dimensional pure sink flow. The fluid flow in such a pure sink flow has only radial velocity. When the fluid flow field of the vortex rate sensor is subjected to an angular velocity relative to inertial space, a pure vortex flow having only tangential (or rotational) velocity is superimposed upon the pure sink flow. The superposition of the pure sink flow and the pure vortex flow results in a combined vortex-sink flow in which the fluid streamlined pattern is a logarithmic spiral, if the viscous effects in the flowing fluid are neglected.

To satisfy the equation of continuity, the radial velocity of a pure sink flow will increase due to the narrowing of the streamlines as the fluid approaches the sink (also referred to as a core, bore, passage, or exit tube) of the vortex rate sensor. Due to the principle of the conservation of angular momentum, the tangential or rotational velocity of the pure vortex flow will also increase as the flow approaches the sink. It follows that the velocity of the fluid in the combined vortex-sink flow increases as the fluid approaches the sink. By sensing the vorticity (rotational component) of the fluid flow within the vortex rate sensor a measurement of the input angular velocity is obtained.

Prior art vortex rate sensors have proposed a multitude of means for sensing the effect of the input angular velocity upon the fluid flow, that is, the vorticity of the fluid flow. The prior art sensing means comprise pressure responsive means, optical means, and radioactive means. However, the prior art vortex amplifier means have limited accuracy due to the non-linearity of the output signal. Also the prior art vortex amplifiers have a limited range over which input rates may be sensed.

The applicant has overcome the disadvantages of the prior art by utilizing a vortex fluid amplifier as a null reading device for sensing input rates (angular velocity). The applicant's unique rate sensing device operates as a servomechanism and obtains a readout signal which is a linear function of the applied rate (angular velocity). This results in a much more accurate readout signal than was heretofore attainable and over a much greater range than heretofore possible. This readout signal may be utilized to control any apparatus which requires such information.

The applicant obtains this result by providing a vortex fluid amplifier utilizing an electrolyte as the fluid therein. By applying a magnetic field substantially perpendicular to the direction of current and electrolyte flow through the vortex fluid amplifier a force is applied to the electrolyte fluid tending to rebalance the vorticity or vortex flow of the fluid. The applicant rebalances the vorticity of the vortex fluid amplifier by varying either the magnitude of the current flowing through the vortex amplifier or the magnitude of the magnetic field across the fluid vortex amplifier, or both.

It is therefore an object of this invention to provide an improved control apparatus.

Figure 2:
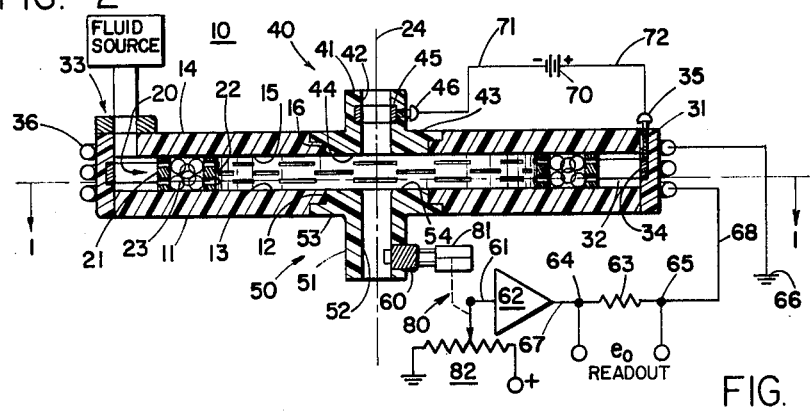
Figure 3:
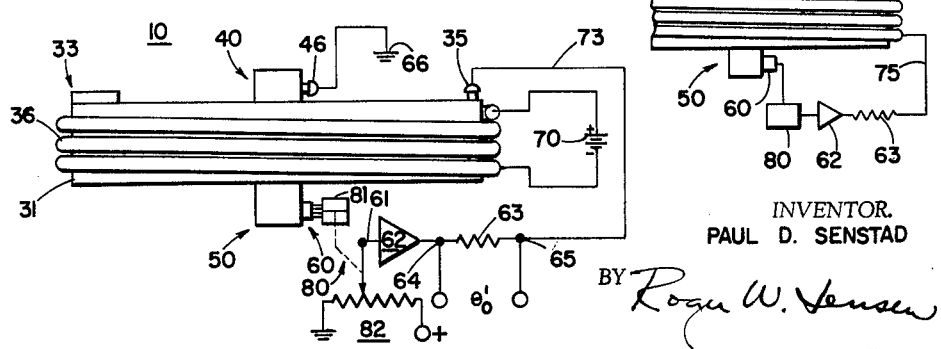
Figure 4:
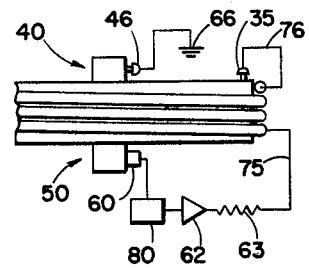

This and other objects of the invention will become apparent from a study of the accompanying specification and claims in conjunction with the drawings in which:

FIGURE 1 is a schematic cross-sectional view of a vortex rate sensor taken along lines 1—1 of FIGURE 2; and FIGURE 2 is a schematic cross-sectional view of a vortex rate sensor taken along lines 2—2 of FIGURE 1; and FIGURE 3 is a schematic view of a vortex rate sensor illustrating an alternate embodiment of the applicant's invention; and FIGURE 4 is a schematic view of a vortex rate sensor illustrating an alternate embodiment of the applicant's invention.

Referring now to FIGURE 1, reference numeral 10 generally depicts a vortex rate sensor. A generally cylindrical electrical insulating plate element 11 is provided having a central aperture 12 of circular cross section therein. Referring to FIGURE 2, plate element 11 has a plane surface 13 thereon. A second generally cylindrical electrical insulating plate element 14 is provided having a plane surface 15 thereon. Plate element 14 has a central aperture 16 of circular cross section therethrough.

Reference numeral 20 depicts a ring-shaped, or annular, or cylindrical porous coupling means. Coupling means 20 comprises a generally cylindrical outer screen element 21 and a generally cylindrical inner screen element 22. Positioned between inner screen 22 and outer screen 21 are a plurality of glass balls 23 which are very small in diameter, on the order of .015 inch. It is clear that coupling means 20 is porous in nature and allows fluid to pass therethrough with a minimum of restriction. The applicant does not wish to be limited to the particular coupling means illustrated in FIGURE 1; other suitable porous coupling means may be utilized for example sintered metals, ceramics, or the like.

Cylindrical coupling means 20 is positioned between plane surface 13 of plate element 11 and plane surface 15 of plate element 14 thereby maintaining plane surfaces 13 and 15 in a spaced parallel relationship. The axis of the cylindrical coupling means 20 is identified by reference numeral 24. Axis 24 is substantially perpendicular to plane surfaces 13 and 15.

Plate elements 11 and 14 in conjunction with coupling means 20 collectively define a vortex chamber 30. The outer periphery of the chamber 30 is defined by inner screen element 22. The ends of the cylindrical chamber 30 are defined by plane surface 13 of plate element 11 and by plane surface 15 of plate element 14.

A generally cylindrically shaped electrical insulating element 31 is positioned around the outer periphery of plate elements 11 and 14 thus enclosing the space therebetween. Element 31 is rigidly attached to plate elements 11 and 14 by a suitable means (not shown) such as screws or adhesives. Element 31 is spaced apart from outer screen element 21 and in conjunction therewith defines a supply chamber between the plate elements 11 and 14 which is identified by reference numeral 32. Fluid is supplied to the supply chamber 32 through a suitable ingress 33 as illustrated in FIGURE 2.

A first generally hollow cylindrical or annular electrode 34 is positioned around the outer periphery of supply chamber 32. Electrode 34 is rigidly attached to the inner periphery of element 31 by suitable means (not shown). A terminal means 35 is positioned within element 31; one end connects to electrode 34 and the other end extends to the exterior of element 31.

Positioned around the outer periphery of element 31 is a coil means 36 which is illustrated as rigidly attached to element 31. The function of coil 36 is to supply a substantially uniform magnetic flux field within vortex chamber 30 which is substantially parallel to the axis 24. The operation of coil 36 will be further discussed hereinafter. The applicant does not wish to be limited to the utilization of coil means 36 to provide a substantially uniform magnetic field within chamber 30. Other configurations, e.g., a permanent magnet, are within the scope of the applicant's invention.

A first exit member 40 is provided. Exit member 40 comprises a tube or fluid conduit 41 having a generally cylindrical bore or passage 42 therethrough. The applicant does not wish to be limited to a cylindrical passage, other configurations are within the scope of this invention. Conduit or tube 41 has an external flange portion 43 on one end thereof. The flange portion 43 is positioned with aperture 16 of plate element 14 so that the bore 42 of exit member 20 is positioned substantially coaxial with axis 24. However, other configurations of the vortex rate sensor in which the exit passage is deliberately offset from the axis 24 (not coaxial) to take advantage of the flow characteristics may be utilized. An end surface 44 of exit member 40 is positioned so as to lie in the same plane as the plane surface 15 of plate element 14. Exit member 40 is rigidly attached to plate 14 by suitable means (not shown) such as adhesives or screws.

A second generally hollow cylindrical or annular element 45 is positioned around the periphery of passage 42. It will be noted that electrode 45 is recessed within tube 42 and attached thereto by suitable means (not shown) so that the inner periphery of electrode 45 is flush with the passage 42. A terminal means 46 is positioned within element 41; one end of terminal 46 connects to electrode 45 and the other extends to the exterior of tube element 41.

Electrodes 34 and 45 are connected across a current source 70. Terminal 46 is connected to one side of current source 70 by lead 71. Terminal 35 is connected to the other side of current source 70 by lead 72.

A second exit member 50 is also provided. Exit member 50 comprises a tube or fluid conduit 51 having a generally cylindrical bore or passage 52 therethrough. The applicant does not wish to be limited to a cylindrical passage, other configurations are within the scope of the applicant's invention. Conduit or tube 51 has a flange portion 53 on one end thereof. The flange portion 53 is positioned within the aperture 12 of the plate element 11 so that the bore 52 of exit member 50 is positioned substantially coaxial with the axis 24. However other configurations of the vortex rate sensor in which the exit passage is deliberately offset from axis 24 (not coaxial) to take advantage the flow characteristics may be utilized. An end surface 54 of exit member 50 is positioned so as to lie in the same plane as the plane surface 13 of plate member 11. Exit member 50 is rigidly attached to plate member 11 by suitable means (not shown) such as adhesives or screws.

A pickoff means 60 is positioned within exit tube 50. A suitable pickoff means is disclosed in the copending application Serial No. 156,613, filed December 4, 1961, in the name of Richard J. Reilly, and assigned to the same assignee as present application. The copending application discloses a fluid flow sensor utilizing a blade element positioned between two pressure ports. The pressure differential across the blade element is indicative of the fluid flow pattern. The pressure output signal of pickoff means 60 is connected by suitable means to a transducer means 80. Transducer means 80 comprises a differential pressure actuator 81 mechanically coupled to a potentiometer 82. Transducer means 80 converts the pressure signal of sensor means 60 to an electrical signal which is indicative thereof. The wiper of potentiometer 82 is connected by lead 61 to amplifier means 62. The output of amplifier means 62 is connected in series relationship with readout or resistance means 63 and coil means 36. Lead 67 connects amplifier 62 to terminal 64 of readout means 63. Lead 68 connects terminal 65 of readout means 63 to coil 36. It will be noted that the other end of coil 36 is connected to ground potential as at 66.

It should be noted that it is not necessary to utilize two exit passages. It is possible to utilize only a single exit passage in the vortex amplifier. If one exit passage is utilized, the electrode 45 and the pickoff 60 would both be located therein.

It should be noted that it is within the scope of the invention to interchange the relative directions of the current flow and magnetic flux flow. That is to say, the only requirement in obtaining a rebalance force upon the fluid is that a component of a magnetic flux field and a component of a current are perpendicular thus producing a force upon the fluid mutually perpendicular to the magnetic flux flow and the current flow.

*Operation*

In operation, a pressure differential exists between passages 42 and 52 of exit members 40 and 50 respectively. Consequently an electrolytic fluid flows through coupling means 20, through chamber 30, and exhausts through passages 42 and 52. In the absence of any input (angular velocity about axis 24) the fluid flow has only radial velocity as illustrated by the vectors $V_r$ in FIGURE 1. This radial flow is described by those skilled in the art as a pure sink flow. The radial velocity of the fluid increases as the fluid approaches passages 42 and 52.

When the vortex rate sensor 10 is subjected to an input rate, that is an angular velocity $\omega$ about the axis 24, the fluid which is flowing thorugh coupling means 20 is given a tangential or rotational velocity as illustrated by the vectors $V_t$ in FIGURE 1. A flow field of tangential or rotational velocity only is referred to by those skilled in the art as a pure vortex flow. The tangential or rotational velocity of the fluid increases ($V_t \times R =$ Constant) as the fluid approaches the passages 42 and 52, in accordance with the application of the principle of conservation of angular momentum.

The superposition of a pure vortex flow upon a pure sink flow results in a combined vortex-sink flow. The streamline pattern of the fluid in the combined vortex sink flow is logarithmic spiral as identified by reference symbol $V_c$ in FIGURE 1. As fluid flowing in the logarithmic spiral flow pattern reaches the sink it flows out of the chamber 30 into passages 42 and 52. This results in a fluid flow pattern in a form of a helix in passages 42 and 52. That is, there is a component of fluid flow having a longitudinal velocity parallel to the axis 24 and a component of fluid flow having a rotational velocity perpendicular to axis 24. It should be noted that the component of fluid flow within passages 42 and 52 perpendicular to the axis 24 is indicative of the input rate $\omega$. Consequently, it is possible to determine the input rate $\omega$ by sensing the tangential component of the fluid flow.

The applicant has provided an improved rate sensing device by utilizing a basic vortex rate sensor and modifying it to produce a null reading device. That is, the vortex rate sensor is operated by the applicant as a servo-mechanism system. The vorticity of the rate sensor is rebalanced by applying a force to the fluid to substantially null out the vorticity. This null reading vortex rate sensor will operate with a very minimum of actual vortex flow and consequently will obtain a readout which is a linear function of the applied angular velocity about axis 24. In addition, the useful range of the vortex rate sensor is increased by utilizing it as a servomechanism.

In order to apply a rebalance force to the fluid of the vortex rate sensor the applicant utilizes an electrolyte as the fluid. A voltage is set up across the vortex chamber 30 between electrodes 34 and 45 and a current is conducted by the fluid within the chamber 30, substantially perpendicular to the axis 24 in a radial direction. In one embodiment of the applicant's invention the magnitude of the current flowing in the chamber 30 is maintained constant. When the vortex rate sensor 10 is subjected to its angular rate about axis 24 pickup means 60 immediately senses this rate and conducts a pressure signal indicative thereof to transducer means 80. More specifically the pressure differential is conducted from sensor 60 to the differential pressure actuator 81. Actuator 81 is displaced in response to the differential pressure signal and repositions the wiper of potentiometer 82. The electrical signal developed in potentiometer 82 is indicative of the pressure signal of sensor 60. The electrical signal is conducted through the wiper of the potentiometer and lead 61 to amplifier means 62. The output of amplifier means 62 is connected to coil means 36 so that a current is conducted therein. The existence of a current within coil 36 results in a magnetic field within chamber 30 substantially perpendicular to the direction of the current flowing in chamber 30 (that is, parallel to axis 24). The magnitude of the magnetic field is indicative of the input rate. Consequently a force is exerted upon the fluid flowing within chamber 30 which acts at right angles to both the direction of the current and the direction of the magnetic field. This force tends to rebalance the fluid flow within chamber 30 and substantially to eliminate the vorticity or vortex flow pattern therein. The voltage $e_0$ across readout means 63, is then indicative of the angular input rate.

An alternate embodiment of the applicant's invention is illustrated in FIGURE 3. The components illustrated in FIGURE 3, which are identical to the components illustrated in FIGURE 2, are identified by the same reference numeral as in FIGURE 2. Voltage source 70 is connected across coil means 36 thus supplying a substantially constant magnetic field within chamber 30 parallel to the axis 24. Terminal 46 connects electrode 45 to ground potential at 66. Electrode 34 is connected by terminal 35 and lead 73 to the output of amplifier 62. Any input (angular rate) about axis 24 is sensed by pickoff means 60 which produces a signal indicative thereof. The signal is conducted through lead 61 to amplifier 62. The output of amplifier means 62 is conducted through lead 73 to terminal 35 and electrode 34. Consequently, a potential is set up between electrodes 45 and 34 which is indicative of the input angular rate. Thus by varying the potential and thus the magnitude of the current within chamber 30 and by maintaining the magnetic field constant within chamber 30 the vortex fluid flow is rebalanced in a manner analogous to the previously explained.

An alternate embodiment of the applicant's invention is illustrated in FIGURE 4. The magnitude of both the current and the magnetic field is varied in response to the signal generated by pickoff means 60. In this embodiment, the coil 36 and the electrode 34 are connected in series relationship with pickoff means 60. With reference to FIGURE 4 coil 36 is connected in series relationship with pickoff means 60, transducer means 80, amplifier means 62, readout means 63 by suitable means including lead 75. Coil 36 is also connected in series relationship with electrode 34 by means of lead 76 and terminal 35. Electrode 45 is connected to ground potential 66. Thus, in operation, the magnitude of both the current and the magnetic field are varied in response to the signal generated by pickoff means 60 so as to rebalance the vortex flow of the fluid and the voltage across readout means 63 is indicative of the input angular rate.

The applicant's invention as disclosed in FIGURES 1–4 has utilized direct current energization. However, it is within the scope of this invention to utilize alternating current energization.

Thus the applicant has provided an improved vortex rate sensing instrument. The vortex rate sensor is utilized as a null reading device and thus produces an output signal which is a linear function of the input rate. Further, the useful range of the rate sensing instrument is increased by utilizing it as a null reading device. The vortex rate sensor is rebalanced by applying a force to the fluid as a result of the interaction of a current and a magnetic field.

While I have shown and described a specific embodiment of the invention further modification and improvement will occur to those skilled in the art. I desire to be understood therefore that this invention is not limited to the particular form shown and I intend in the appended claims to cover all modifications which do not depart from the spirit and the scope of this invention.

What I claim is:

1. In a vortex fluid amplifier including a cylindrical chamber; a source of conductive fluid, means for generating a radial fluid flow within said chamber; means for sensing vortical fluid flow; means effective to maintain a substantially constant radial electrical current through said conductive fluid in said chamber; means for producing an axial magnetic field within said chamber including conductor means, amplifier means, and transducer means; means connecting the sensing means to said transducer means; means connecting said transducer means to said amplifier means; and means connecting said amplifier means to said conductor means, so that said conductor means is energized as a function of signals produced by said sensing means.

2. In a vortex fluid amplifier including a cylindrical chamber; a source of conductive fluid, means for generating a radial fluid flow within said chamber; means for sensing vortical fluid flow; means effective to produce a radial electrical current through said conductive fluid in said chamber including transducer means and amplifier means; means for producing a substantially constant axial magnetic field within said chamber including conductor means; and means connecting the sensing means to said transducer means, means connecting said transducer means to said amplifier means, means connecting said amplifier means to said means for producing a radial current through said chamber, said current producing means being energized as a function of signals produced by said sensing means.

3. In a vortex fluid amplifier including a cylindrical chamber having a conductive fluid therein; means for causing a normally radial flow of said conductive fluid within said chamber, rotation of said chamber causing a vortical fluid flow; means for sensing said vortical fluid flow; means for generating an electric field and means for generating a magnetic field perpendicular thereto to produce a force field on said fluid in said chamber as a function of signals produced by the sensing means; and means connecting the sensing means to the generating means so that said means for generating force field produces a force in said conductive fluid in said chamber of such a sense as to oppose the vortical flow in said chamber.

4. In a vortex fluid amplifier including a cylindrical chamber; a source of conductive fluid; said chamber adapted to be connected to said fluid source; means for generating a radial fluid flow within said chamber; means for sensing vortical fluid flow; means effective to maintain a substantially constant axial magnetic field through said chamber; means effective to produce a radial electric current within said chamber; readout means; first connecting means connecting said sensing means to said readout means; and second connecting means connecting said readout means to said means for producing a radial current.

5. In a vortex fluid amplifier including a cylindrical chamber; a source of conductive fluid; said chamber adapted to be connected to said fluid source, means for generating a radial fluid flow within said chamber; means for sensing vortical fluid flow; means effective to maintain a substantially constant current through said chamber and conductive fluid in said chamber; means for producing a magnetic field within said chamber substantially perpendicular to said current; readout means; and means connecting said sensing means to said readout means, means connecting said readout means to said magnetic field producing means, said magnetic field producing means being energized as a function of signals produced by said sensing means.

6. In a vortex fluid amplifier including a cylindrical chamber; a source of conductive fluid; said chamber adapted to be connected to said fluid source, means for generating a radial fluid flow within said chamber; means for sensing vortical fluid flow; means effective to produce an electrical current through said chamber and conductive fluid in said chamber; means for maintaining a substantially constant magnetic field within said chamber substantially perpendicular to said current; readout means; and means connecting said sensing means to said readout means, means connecting said readout means to said current producing means, said current producing means being energized as a function of signals produced by said sensing means so as to apply a force to the conductive fluid in said chamber so as to oppose the vortical flow by said sensing means.

7. In a vortex fluid amplifier including a cylindrical chamber; a source of conductive fluid; said chamber adapted to be connected to said fluid source, means for generating a radial fluid flow within said chamber; means for sensing vortical fluid flow; means effective to produce a current through said chamber and conductive fluid in said chamber; means for producing a magnetic field within said chamber substantially perpendicular to said current; readout means; and means connecting said sensing means to said readout means, means connecting said readout means to said magnetic field producing means, means connecting said magnetic field producing means to the current producing means so that a force field is generated as a function of signals produced by said sensing means so as to apply a force to the conductive fluid in said chamber so as to oppose the vortical flow sensed by said sensing means.

References Cited by the Examiner
UNITED STATES PATENTS

| | | |
|---|---|---|
| 1,841,606 | 1/1932 | Kollsman. |
| 2,203,824 | 6/1940 | Kollsman _____ 33—204 |
| 2,215,447 | 9/1940 | Kollsman _____ 33—204 |
| 3,029,644 | 4/1962 | Loveless et al. |
| 3,034,002 | 5/1962 | Carlson. |
| 3,121,336 | 2/1964 | Riordan. |

FOREIGN PATENTS 116,375   6/1918   Great Britain.

OTHER REFERENCES

Pingelly: Journal of Applied Physics, Jan. 1957, vol. 28, No. 1, pp. 86 to 92.

RICHARD C. QUEISSER, *Primary Examiner.*

SAMUEL FEINBERG, BENJAMIN A. BORCHELT, ROBERT EVANS, *Examiners.*